United States Patent [19]
Kennedy

[11] Patent Number: 5,746,605
[45] Date of Patent: *May 5, 1998

[54] METHOD AND SYSTEM FOR MUSIC TRAINING

[75] Inventor: Stephen E. Kennedy, Dallas, Tex.

[73] Assignee: Red Ant, Inc., Tex.

[*] Notice: The term of this patent shall not extend beyond the expiration date of Pat. No. 5,533,903.

[21] Appl. No.: 677,639

[22] Filed: Jul. 8, 1996

Related U.S. Application Data

[63] Continuation of Ser. No. 254,403, Jun. 6, 1994, Pat. No. 5,533,903.

[51] Int. Cl.$^6$ ................................................ G09B 5/00
[52] U.S. Cl. ............................ 434/307 R; 434/307 A; 84/610; 395/173; 395/806
[58] Field of Search ........................... 434/307 R, 307 A, 434/308, 309, 318, 365, 118; 348/61, 578; 345/122; 395/173–175, 806–807, 326–330; 84/477 R, 478, 609–614, 622, 634–638, 645

[56] References Cited

U.S. PATENT DOCUMENTS
5,130,966  7/1992  Yoshio et al. .

FOREIGN PATENT DOCUMENTS
59-16255  9/1984  Japan .

*Primary Examiner*—Joe Cheng
*Attorney, Agent, or Firm*—David H. Judson

[57] ABSTRACT

A method of and computer system for training a student to play a musical work having an identifiable rhythm structure, the musical work being decomposable into a plurality of variations each maintaining the identifiable rhythm structure. According to the method, a musical score of each variation is generated and then the musical scores are arranged in order of rhythmic difficulty. An animated movie is then generated, the movie comprising the music score of at least one variation, a sound recording of the music score, a graphic device that highlights the identifiable rhythm structure and a representation of how the music score would be played on a musical instrument. The animated movie is then presented to the student.

6 Claims, 4 Drawing Sheets

FIG. 3

METHOD AND SYSTEM FOR MUSIC TRAINING

This is a continuation of application Ser. No. 08/254,403 filed on Jun. 6, 1994, now U.S. Pat. No. 5,533,903" after "Jun. 6, 1994" in the cross reference to Applicant's earlier application.

TECHNICAL FIELD

The present invention relates generally to teaching methods and more particularly to a computer-controlled method of creating and presenting a series of derivative versions of a musical work that are designed specifically to be played in succession for building skills necessary to play the musical work.

BACKGROUND OF THE INVENTION

Learning to play the piano is a complex and challenging task. Although many people can sit down at a piano and play a simple melody, it is far more daunting to learn proper piano techniques. Only a fortunate few end up really mastering the techniques necessary to play even relatively-simple musical works.

There are many well-known teaching methods used to train piano students. These include book lessons, piano methods and classroom training. In traditional music lessons, each lesson is a work in itself, i.e., a closed musical piece. The lessons form a horizontal series of single works that do not lead to a specific goal. The lessons in the series are only conceptually-related in that the lessons are grouped together based on performance difficulty such as "easy" pieces, or based on some objective such as left hand exercises or dotted sixteenth note rhythm drills. The student is expected to perform each lesson and move to the next lesson. In such training, there is little continuity between lessons besides their shared difficulty level or objective. Each lesson becomes a new beginning point for building skills because each is a closed work in itself, separate and distinct from the other lessons. As a result, a student does not specifically apply what is learned in one lesson to the next, but continues to just learn "easy" works or "left hand" drills, for example. There is only the most general transference of skill from one work to the next.

Given the rigidity of and inherent deficiencies in such prior art training methods, it is not surprising that many students give up their formal training before they acquire skills necessary to perform an original musical work. Those that still desire to play the work must typically settle on simplified versions. Some music publishers provide simplified versions or so-called "big-note" versions of musical works. This type of sheet music presents a single simplification of a work based on essentially arbitrary decisions about what the student should play. A "big-note" version is not intended to build the skills necessary to play the work it is derived from. Just like a music lesson, it is a closed musical piece that does not specifically lead to another defined work.

There is therefore a long felt need in the field of music education to provide better training tools and methodology to help build skills necessary to play musical works.

BRIEF SUMMARY OF THE INVENTION

It is a primary object of the invention to provide methods and systems that enhance the skills of students learning how to play a musical instrument such as the piano.

It is also an important object of the invention to describe a novel process and method of creating and presenting a series of derivative versions of a musical work that are designed preferably to be played in succession with the specific intent of building the skills necessary to play the musical work. Such skills include physical dexterity, familiarity with rhythmic patterns, and recognition of musical structure.

It Is still a further object to provide a computer "multimedia" system for creating and presenting the series of derivative versions of the musical work. The system advantageously integrates a personal computer, an electronic keyboard and an audio subsystem. The computer supports a development module that receives music score inputs from the electronic keyboard and uses this information to facilitate the creation of an animated movie comprising the derivative versions of the work. The computer also supports a training module that is structured into a number of learning areas, each of which is designed to teach the student to either recognize the variation between derivative versions or to learn to play the variations between the levels.

Once the student selects a musical work to learn, the animated movie for the work is displayed on the computer terminal and the accompanying sounds on played back on the audio subsystem. The display and playback are selectively controllable to enable the student to move between the various levels of the work or to move within a particular level at his or her own desired speed. Preferably, particular notes or beats are highlighted to reveal accents or music patterns during playback.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 3 is a sample of a portion of a particular music work which has been decomposed into the series of derivative versions according to the techniques of the present invention;

Similar reference characters refer to similar parts throughout the several views of the drawings.

DETAILED DESCRIPTION

Figure 1:
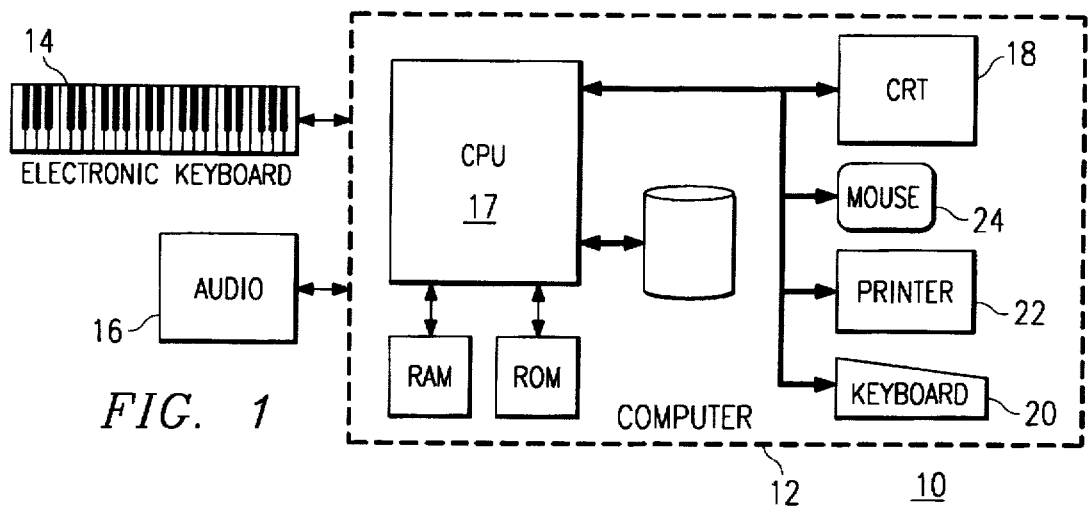
FIG. 1 is a block diagram of the multimedia system for implementing the present invention.

The present invention is described in the context of piano training but is applicable to other types of music training including training for string, windwood, brass and percussion instruments. A preferred embodiment is a piano teaching system which comprises the various components shown in FIG. 1. Training system 10 includes a computer 12, an electronic keyboard 14 and an audio subsystem 16. The audio subsystem may be part of the computer (such as a sound card and associated speakers) or a standalone device. The personal computer 12 includes such conventional components as a processor 17, a display 18, a keyboard 20, a printer 22, and a user interface 24 such as a point and click device.

The computer 12 is of conventional design and may be a personal computer, a minicomputer, or a computer running in a distributed network. Although the specific choice of the computer is limited only by disk and disk storage requirements, computers in the APPLE® Quadra (such as the Quadra 650) series of computers are particularly useful in implementing the present invention. In the alternative, the computer may be a IBM-compatible platform running a DOS or Windows-based operating system. The computer includes appropriate storage means for storing application programs for carrying out the functions of the inventive method. These programs are executed in a conventional manner by the computer processor 17 under control of the operating system thereof.

The electronic keyboard 14 is preferably compatible with the music instrument digital interface (MIDI) standard and as will be seen is used in the development process to help create the music score for the derivative versions. If the system is implemented just for training purposes (as opposed to both development and training), the electronic keyboard 14 may be omitted. In such case the system is set up in proximity to another keyboard (such as a conventional piano) to enable the student to use the animated movie(s) during the lesson. The audio subsystem includes one or more speakers and/or a pair of headphones and is controlled by the computer to provide playback of the musical work and the derivative versions thereof.

Figure 2:
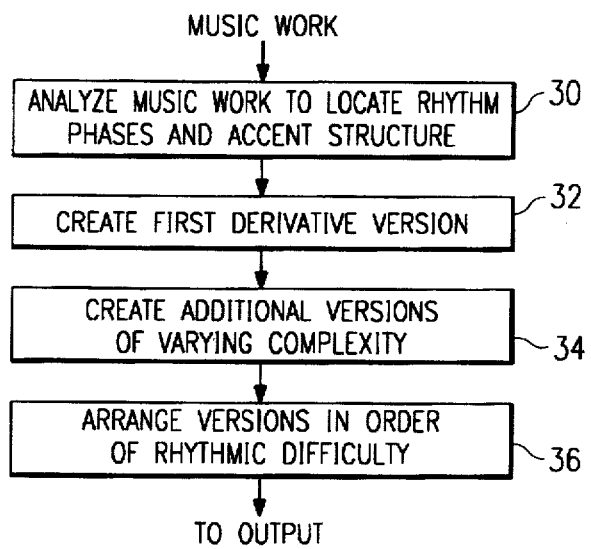
FIG. 2 is a logic diagram outlining how the present invention creates a series of derivative versions of a musical work.

Referring now to FIG. 2, a preferred technique is described for creating a series (i.e., more than one) of derivative versions of a musical work, with the versions designed specifically to be played in succession with the intent of building the skills necessary to play the musical work. The method begins at step 30 with an analysis step. Almost all Western-oriented music is structured into a common framework involving measures, time frames and music notation. Step 30 involves analyzing a musical work of one or more measures to locate one or more rhythm phrases and the accent structure of each rhythm phrase. A rhythm phrase is a fundamental unit of organization that has two components: a primary accent and a complement. The primary accent is generally a note that takes a stronger accent than any other note in the phrase. Musical phrases that have their primary accent at the beginning of the rhythm phrase are referred to as "beginning accented" whereas those that have their primary accent at the end of the phrase are called "end accented".

Figure 3:
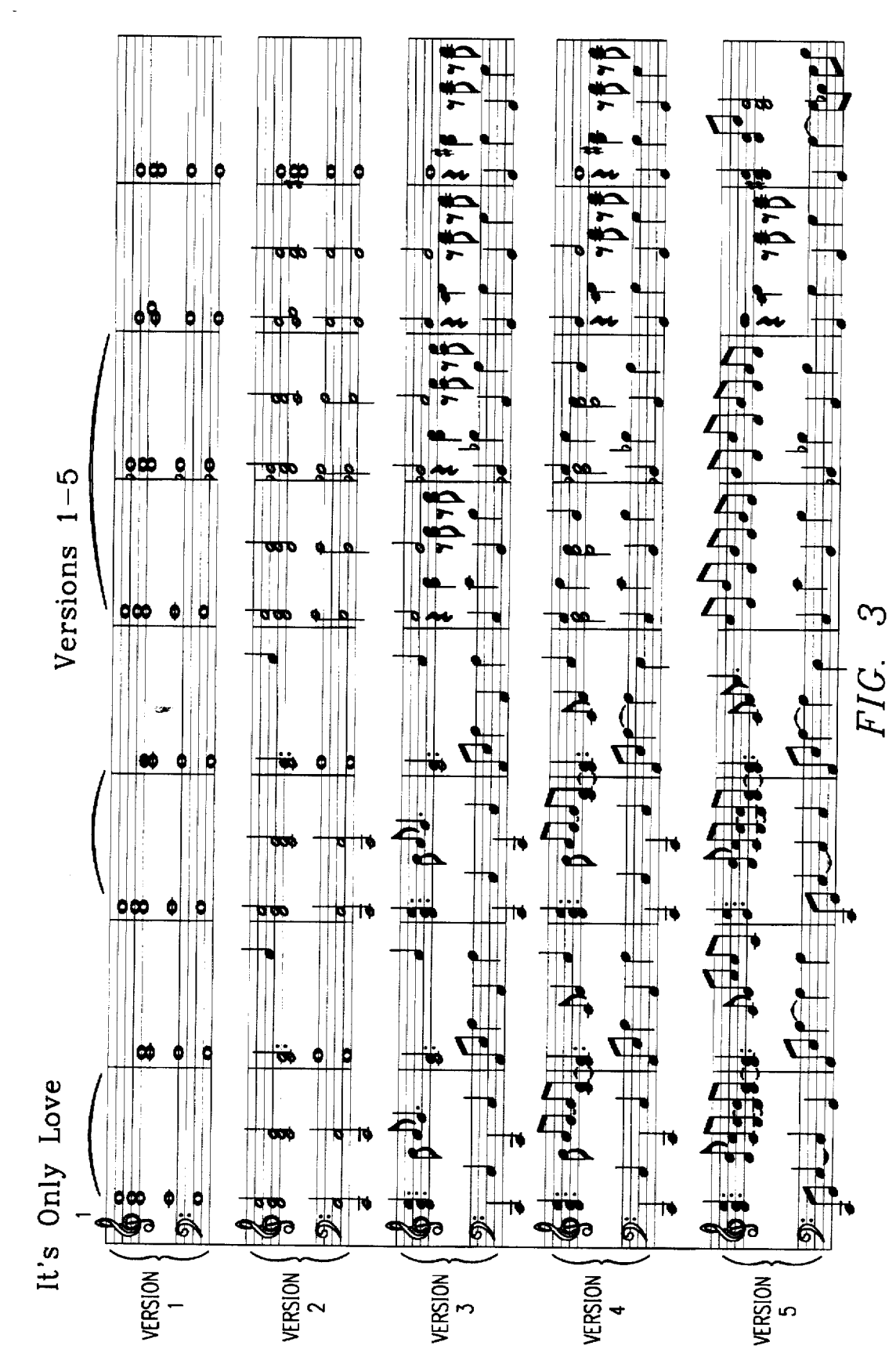

After the musical work is analyzed to locate the rhythm phrases and the accent structure of each phrase, the method continues at step 32 to create a first derivative version or "variation" of the work. The first derivative version will be the simplest variation, i.e., the one that is the easiest to play for the student and the one that clearly brings out the accent structure in its most basic form. Preferably, the method creates the first derivative version of the work by highly simplifying and/or omitting significant portions of the melody and harmony to emphasize either end accented or beginning accented phrases. After creation of the first derivative version, the method continues at step 34 to create one or more additional versions of the work, each progressively more complex than the previous version(s) but all of which maintain the same continuity of rhythm and pattern. Continuity is maintained between each version by systematically clarifying and emphasizing the phrase accents in each version. Typically, this will be accomplished by adding in progressively more and more of the phrase complements as the versions are created. As seen in FIG. 3, continuity is maintained between each version of the work by adding more notes to the simplified work from the original work while maintaining the locations and rhythms of the primary accent notes in each variation. At step 36, the versions are arranged in order of rhythmic difficulty, with the original work placed at the end of the series.

Thus according to the method, phrase accents are located and used as the guide for simplifying the complex rhythmic structure of a musical work. The rhythm phrases and their accents form the core of the work and the successive, more complex variations are built upon these phrases and their accents to insure that each variation maintains its connection to the rhythmic "feel" of the original work. Importantly, each version presents a different level of simplification yet maintains continuity with the original work. As each version of the composition is preferably created by simplifying the rhythm patterns and then restating the composition, each such version can be said to be a "simplification". The level of simplification is controlled by the number and degree of accented notes that remain in the derivative pattern. This commonality provides for a high degree of skill transference as the student progresses through the various levels.

The method of FIG. 2 is shown by way of example in FIG. 3. In particular, FIG. 3 shows conventional sheet music for three (3) complete rhythm phrases of an original work, and in this example the first two rhythm phrases each comprise two measures of the work, and a third rhythm phrase comprises the next three measures. The three rhythm phrase is actually comprised of three subphrases. The first two rhythm phrases are end accented as evidenced by the highlighted notes in the second measure of each phrase. The three rhythm phrase is comprised of two subphrases that are beginning accented with the overall phrase being end-accented. The actual musical work is scored at Version 5 and represents the desired score that the student would ultimately want to play. As can be seen, Version 5 is difficult to play in that it includes melody and complex harmony and rhythms. Step 32 of the method of the invention decomposes this complex score into the most basic variation, Version 1, which omits almost all of the melodic and rhythmic structure. Version 1, however, does embody each rhythm phrase, and the accent for each phrase is highlighted. Step 34 of the invention builds the successive variations, in this case three additional variations are created, so that in total four variations of the original work are provided. Of course, the actual number of variations is quite arbitrary and the example shown in FIG. 3 should not be considered limiting.

Figure 5:
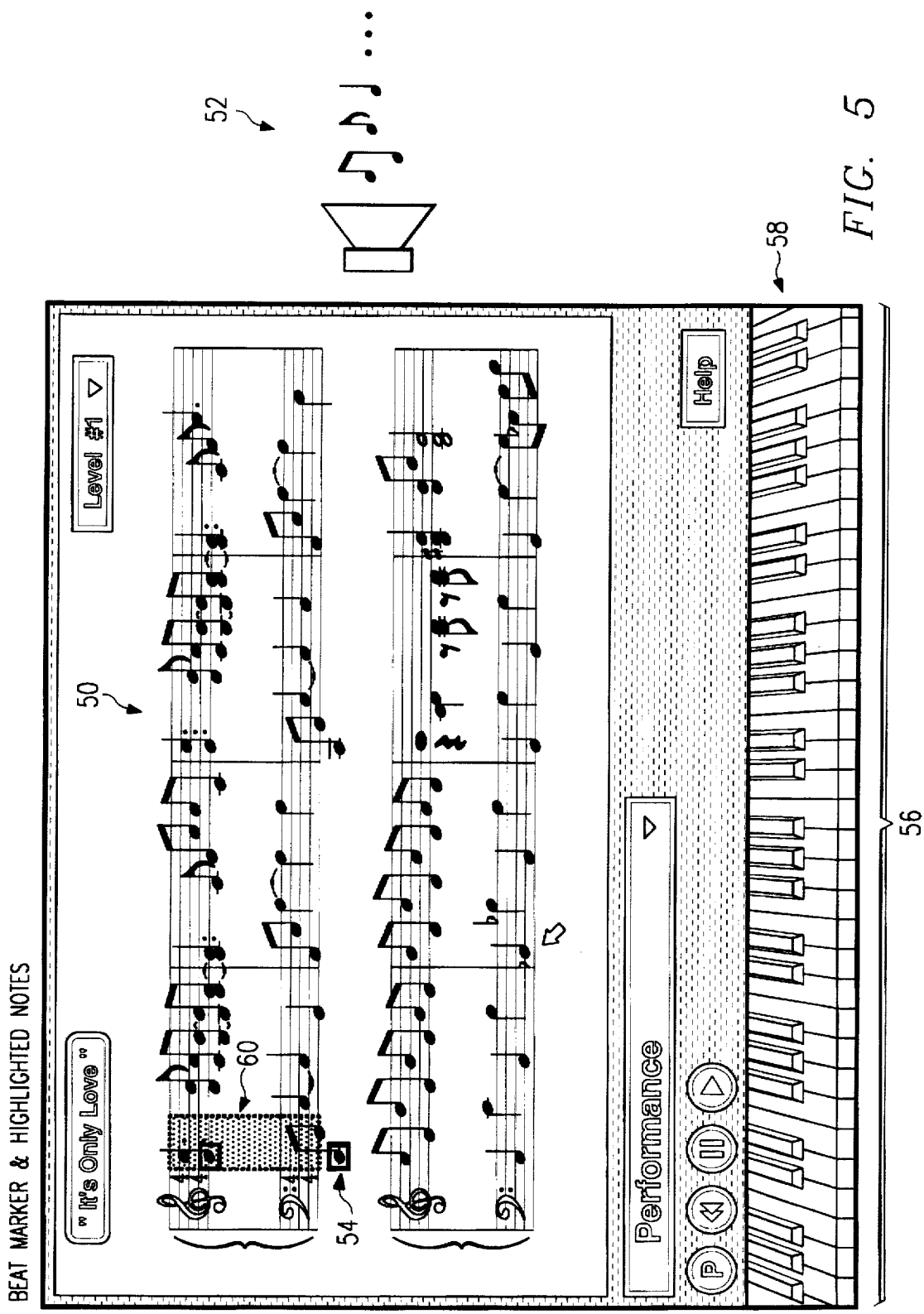
FIG. 5 is a representative screen display for the Performance submodule showing the music highlighting feature of the invention.

Each variation is successively more complex that the previous variation yet exhibits the same continuity of rhythm and pattern by maintenance of the phrase accents across the variations. Version 2 is thus slightly more complex than Version 1, Version 3 is slightly more complex Version 2, and so forth. As can be seen, with each successive version, more and more of the complement structure of each rhythm phrase (in this example, the music from version 5) is added back into the piece, yet all the time the continuity of rhythm and pattern are maintained across the different versions. The versions are arranged in order of rhythmic difficulty substantially as shown, although it should be appreciated that a reverse order (with Version 5 at the top) may be used. As can be seen, as the versions increase in rhythmic difficulty, they become more difficult to perform. As seen in FIG. 5, the variations also become more difficult in terms of harmonic and melodic complexity as well. Therefore, generally speaking the simplifications of the composition vary in performance difficulty (which includes aspects of rhythm, melody and harmony), thus greatly aiding the student in learning how to play the original piece as he or she advances through the simplifications.

The method of FIG. 2 (as evidenced by the example of FIG. 3) allows students of all degrees of skill to play along with a chosen work at their current degree of performance skill. In particular, when the student plays even the lowest or simplest version, the audio subsystem simultaneously plays at least the melody of the work so that the student can tell that he or she is playing along with the work. Because each version presents a different level of simplification yet maintains continuity with the original complex work, a student playing even the most simplified version feels as if he or she is playing along with the work. By maintaining continuity among the versions derived from the work, there is a high degree of skill transference as the student progresses through the versions. This transference increases efficiency in learning because skills development in one version are immediately applied in the more complex version.

Figure 4:
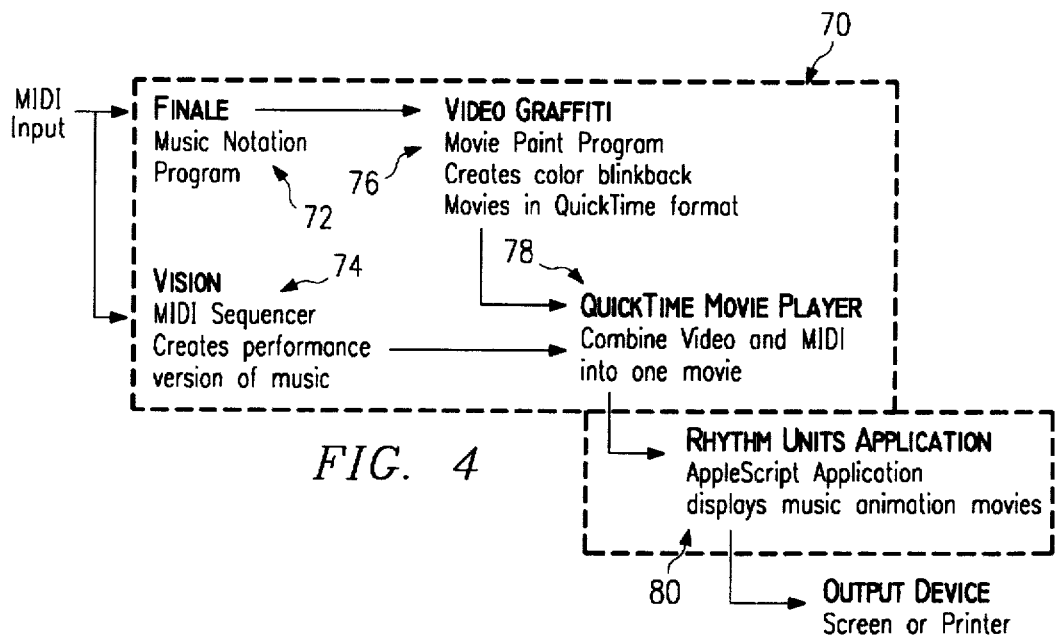
FIG. 4 is a simplified block diagram of the development and training modules and related programs according to the preferred embodiment of the present invention.

Referring now to FIG. 4, a simplified block diagram is shown of the development and training modules and related programs according to the preferred embodiment of the present invention. As noted above, the development module is used to create an animated movie for use by a student. The development module is supported in the computer 12 and cooperates with the electronic keyboard 14 to facilitate creation and display of the animated movie. As used herein, an animated movie preferably comprises a number of different components: at least one music score, a sound recording of the music score adapted to be played on the audio subsystem as the music score is presented to the student, a graphic device that highlights the identifiable rhythm structure, and a representation of how the music score would be played on the musical instrument A "snapshot" of an illustrative animated movie generated by the present invention is shown in FIG. 5. As seen in that figure, the animated movie comprises the music score 50 for one of the versions (in this case Version 5, the original work), a sound recording 52 of the music score 50, a note marker 54 highlighting the accent structure of each rhythm phrase, and a representation 56 of the score as it should be played on the music instrument. In the latter regard, the music instrument is a simulated piano keyboard 58 and the "representation" 56 comprises the particular fingering for that portion of the score being played. The note marker is preferably a color highlight. If desired, the animated movie may also include a color-shaded beat marker 60 which functions as a visual metronome by moving along the score to indicate the timing of the piece as it is played back and displayed. If another type of music instrument is used, e.g., a guitar, the simulation 58 would be changed to reflect the appropriate physical structure (in that case a guitar fretboard).

Figure 6:
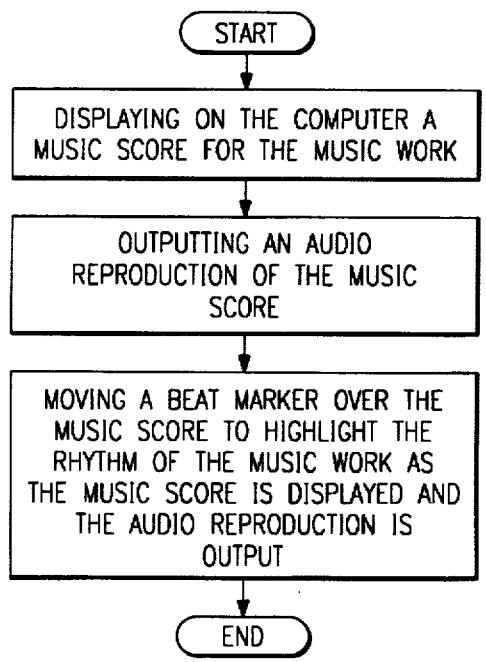
FIG. 6 is a flowchart of a method for training a student to play a music work according to the invention.

Thus as illustrated in the flowchart of FIG. 6, as the animated movie is presented to the student, the student can hear the music, see the music score being played, visualize the accent structure (which is being highlighted) and see how the particular notes should be played on the simulated musical instrument. Of course, more than one music score (i.e., more than one variation) may be displayed simultaneously on the display.

The development module 70 of FIG. 4 is used is create the animated movie for each variation. The development module 70 composes a number of software applications: a music notation program 72, a music performance program 74, a movie paint program 76 and a movie player program 78. Music notation program 72 receives music input data from the electronic keyboard 14 (in the MIDI format) and creates a data file corresponding to the variation. The music input data is also input to the music performance program 74 which creates a performance version of the music score. The data file output from the music notation program 72 is a music score (i.e., musical notation) of the variation and this data file is exported to the movie paint program 76. Paint program 76 animates the music score (so that it can be displayed in a realtime manner on the display) and creates the highlight for the accent structure. The paint program creates movie "stills" needed for the color animation of the music. The output (i e., video) from the paint program 76 and the output (i.e., audio) of the music performance program 74 are then combined by, the movie player program 78 into the animated movie. In particular, program 78 synchronizes the color stills with the MIDI performance creating an animated musical movie.

In the illustrative embodiment, the music notation program 72 is FINALE, available from Coda Music Software in Minneapolis, Minn. The music performance program 74 is VISION, which is made by OpCode System, Inc. of Palo Alto, Calif. The movie paint program is VIDEO GRAFFITI, which is available from Neil Media of Redwood City, Calif. The movie player program is preferably QUICKTIME, available from Apple Commuter in Cupertino, Calif. Such programs are run on the Apple Quadra 650 platform. Of course, other programs, and techniques for creating the animated movies are within the scope of the present invention.

The training module comprises the RHYTHM UNITS™ application 80 which receives the animated movies created by the development module and controls the playback of such movies on the computer system. Application 80 provides the user interface for the training system and uses a menu-driven approach to guide the student in operating the system. Preferably, the application includes a number of learning area submodules including Performance, Tutor, Dexterity, Ear Training and Walk Through. The Performance submodule allows the student to practice playing each of the variations of the work and is the primary submodule for presenting the animated movie. In particular, FIG. 5 shows the Performance submodule in operation, in this case displaying the animated movie comprising several bars of Version 5, the highlighted accented structure, the beat marker and the fingering representation on the simulated keyboard. As the variation is displayed and played-back in realtime (at a speed controlled by the student), the beat marker moves along the score and the fingering changes to show the student how the piece is to be played. As the piece progresses, the screen display wraps around to the next portion of the music score. Using the point and click device (or some other suitable input such as a microphone controlled by a voice recognizer), the student can "pause" the movie, advance or reverse the movie, or seek additional help.

The Tutor submodule explains the development of each variations. Preferably, the submodule provides additional color highlights to show the student the patterns in the music. The Dexterity submodule provides finder exercises based on the variations. The Ear Training submodule helps train the student to recognize the difference between versions from one level to the next. The Walk Through submodule provides a rhythm unit by rhythm unit breakdown of the musical work on each level.

The application 80 also processes the music highlights on the screen display. For example, a single note highlight can be provided as the music plays. The application also causes the display of the beat marker which provides a shaded area over the time allotted to each beat in the score notation. It further provides the representation on the simulated musical instrument. Highlight and animation of the keyboard and notation are created by the paint program and movie program. The application 80 plays these movies back at different speeds and provides the navigation controls to access the animation in the proper order, and as desired by the user.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A method, using a computer, for training a student to play a music work on a music instrument, the music work having an identifiable rhythm determined by a number of beats and a time value assigned to each musical note in a measure, comprising the steps of:

displaying on the computer a music score for the music work;

outputting an audio reproduction of the music score; and moving a beat marker over the music score to highlight the rhythm of the music work as the music score is displayed and the audio reproduction is output.

2. The method of claim 1 further including the step of displaying a simulated musical instrument and a series of finger placements representing how the music work would be played on a musical instrument.

3. The method of claim 1 wherein the musical instrument is a piano.

4. The method of claim 1 wherein the musical instrument is a guitar.

5. A method, using a computer, for training a student to play a music work on a music instrument, the music work having an identifiable rhythm determined by a number of beats and a time value assigned to each musical note in a measure, comprising the steps of:

displaying on the computer a music score for the music work; and moving a beat marker over the music score as a visual metronome to highlight the rhythm of the music work as the music score is displayed, wherein the beat marker highlights at least one beat of musical time represented in the music score as determined by the time value.

6. A method of training a student to play a music work, comprising the steps of:

creating a plurality of notational variations of the music work, each of the notational variations being progressively more complex than a prior notational variation and wherein all of the notational variations retain some predefined structure of the music work;

arranging the notational variations in some predefined order of difficulty; and teaching the student to play the music work by presenting to the student the notational variations in some predetermined order such that the student may master the notational variations in a progressive manner as the student's performance skill increases.

\* \* \* \* \*